Dec. 21, 1965   C. W. JEEP, JR., ETAL   3,225,158
FLUID PRESSURE OPERATED SWITCH WITH LOOSE, FLEXIBLE DIAPHRAGM
Filed Jan. 14, 1964
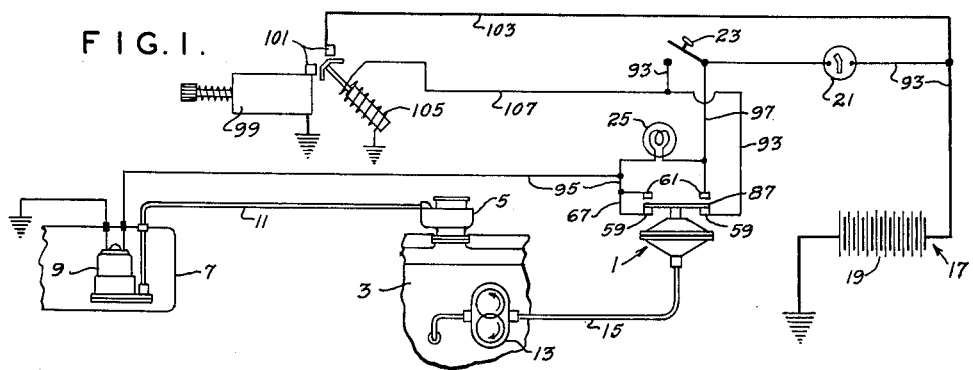
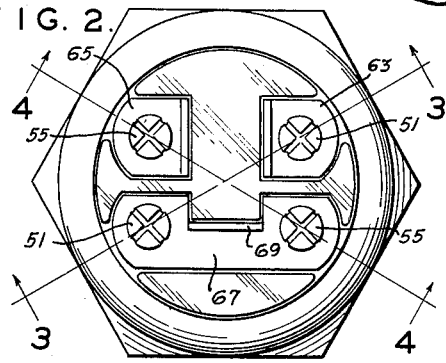
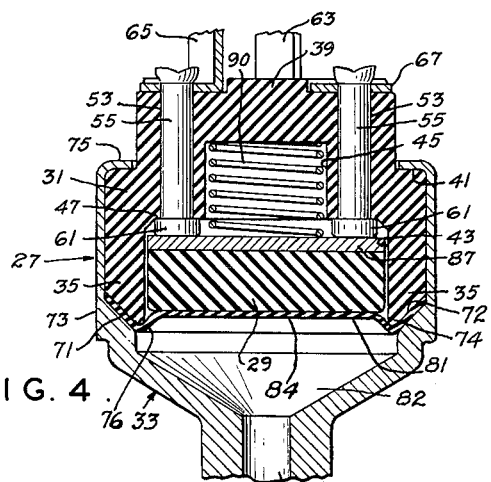
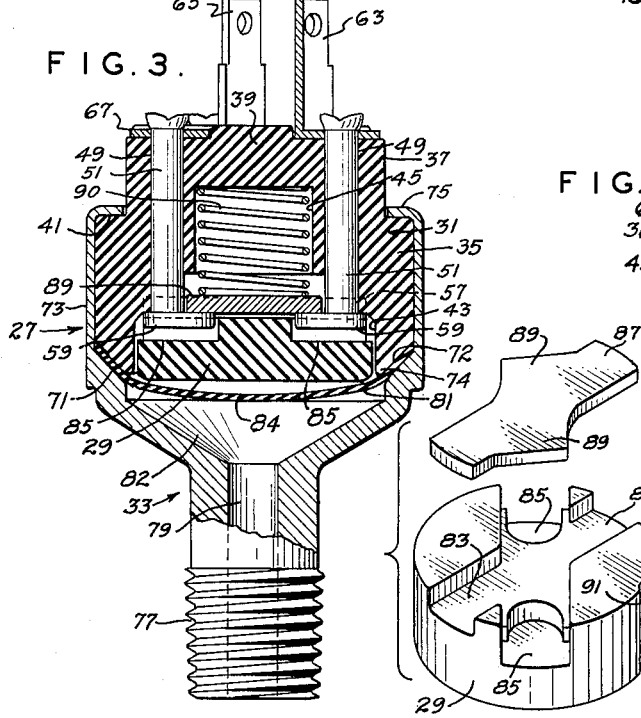
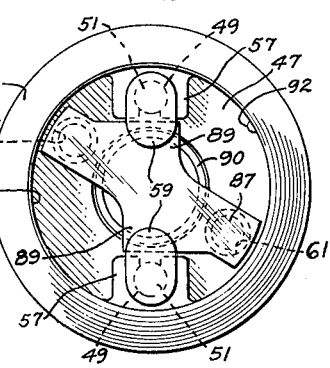
INVENTORS
CHARLES W. JEEP JR.
EDGAR W. NIEMEYER
BY
AGENT

United States Patent Office 3,225,158
Patented Dec. 21, 1965

3,225,158
FLUID PRESSURE OPERATED SWITCH WITH LOOSE, FLEXIBLE DIAPHRAGM
Charles W. Jeep, Jr., Webster Groves, and Edgar W. Niemeyer, Normandy, Mo., assignors to ACF Industries Incorporated, New York, N.Y., a corporation of New Jersey
Filed Jan. 14, 1964, Ser. No. 337,667
1 Claim. (Cl. 200—83)

This application is a continuation-in-part of our co-pending application Serial Number 35,799, filed June 13, 1960, now Patent No. 3,121,145.

This invention relates to fluid pressure switches, and particularly to an oil pressure switch for automotive use.

Among the several objects of the invention may be noted the provision of an improved fluid pressure switch, and particularly an oil pressure switch, which is particularly useful in a fuel supply system for the internal combustion engine of an automotive vehicle of the type including an electric pump in the fuel tank of the vehicle, the pressure switch being adapted to initiate operation of the pump on closing the starter switch for the engine and to maintain the pump in operation in response to development of oil pressure by the usual engine-operated oil pump after the starter switch opens; the provision of a pressure switch such as described which is economical to manufacture, of rugged construction and reliable in use; and the provision of a switch such as described which is also adapted to control an oil pressure warning signal, such as the usual oil pressure warning lamp on the dashboard of the vehicle. Other objects and features will be in part apparent and in part pointed out hereinafter.

The invention accordingly comprises the constructions hereinafter described, the scope of the invention being indicated in the following claim.

In the accompanying drawings, in which one of various possible embodiments of the invention is illustrated, FIGURE 1 is a diagram of a fuel supply system for the engine of an automotive vehicle having an oil pressure switch of this invention incorporated therein;

FIGURE 2 is a plan view of the oil pressure switch per se;

FIGURE 3 is a longitudinal cross section of the switch taken on line 3—3 of FIGURE 2;

FIGURE 4 is a longitudinal cross section of the switch taken on line 4—4 of FIGURE 2;

FIGURE 5 is a bottom plan view of a subassembly of the switch; and,

FIGURE 6 is an exploded perspective showing a piston and a contactor of the switch, Corresponding reference characters indicate corresponding parts throughout the several views of the drawings.

Referring to the drawings, FIGURE 1 illustrates a fuel supply system for the engine of an automotive vehicle having an oil pressure switch 1 of this invention incorporated therein. The switch is shown diagrammatically in FIGURE 1 better to illustrate its function. The engine is indicated at 3, and is shown with the usual carburetor 5 thereon. At 7 is indicated the fuel tank of the vehicle. In this tank is an electric fuel pump 9 for pumping fuel from the tank through a fuel line 11 to the carburetor. At 13 is indicated the usual oil pump which is driven by the engine for pumping oil to various engine lubrication points. The oil pressure switch 1 of this invention is responsive to oil pressure developed by pump 13, being connected to the outlet of pump 13 by an oil line 15. Switch 1 is a double-throw switch, and is connected in a circuit generally indicated at 17 which includes the battery 19, the ignition switch 21, and the starter switch 23 of the vehicle for effecting operation of the electric pump 9 on closing the starter switch 23 and for maintaining the pump 9 in operation in response to development of oil pressure by the engine-driven oil pump 13 after the engine has been started and switch 23 has been released. An oil pressure warning lamp 25, which as will be readily understood is conventionally provided on the dash of the vehicle, is also connected in the circuit 17 in such manner that the lamp is energized whenever the oil pressure is below a predetermined value, as determined by the oil pressure switch 1.

As illustrated in details in FIGURES 2-6, the pressure switch 1 comprises a cylinder designated in its entirety by reference character 27 and a piston 29 movable in the cylinder. The cylinder consists of two parts: a cup-shaped electrical insulation body 31 and a head 33 (which may be made of metal) at the open end of the cup-shaped body. The body 31 may be made of a suitable heat-resistant synthetic plastic material, for example, a phenolic resin material. It has an annular cylindric wall 35 and a reduced-diameter portion 37 at its closed end 39, providing an external annular shoulder 41. Interiorly, the body 31 has a cylindric chamber 43 and a recess 45 of smaller diameter than chamber 43 extending from chamber 43 toward the closed end 39 of the body. This construction provides an interior annular shoulder 47 at the inner end of the chamber 43.

Body 31 has two holes 49 extending from its closed end to the shoulder 47 for the reception of a first pair of electrically conductive rivets 51, which may be made of copper, for example. Holes 49 and rivets 51 are aligned with the axis of cup body 31 on opposite sides of the recess 45 along a line denoted by the section line 3—3 in FIGURE 2. Body 31 also has two holes 53 extending from its closed end to the shoulder 47 for the reception of a second pair of electrically conductive rivets 55, which may also be made of copper, for example. Holes 53 and rivets 55 are also aligned with the axis of cup body 31 on opposite sides of the recess 45 along a line denoted by the section line 4—4 of FIGURE 2. Also, body 31 is integrally formed with ribs 57 (see FIGURE 5) forming a pair of U-shaped grooves extending from the shoulder 47 in the direction toward the open end of the body. Each one of the grooves defined by these ribs being aligned with one of the holes 49 and receiving one of the rivets 51.

Rivets 51 are identical, each having an elongate head 59 projecting laterally outward from the shank of the rivet, and engaging the ends of the respective ribs 57 within the cup-shaped body 31. Each rivet 51 is inserted through the respective hole 49 from the inside of the body 31. Rivets 55 are identical, each being shorter than rivets 51 and having a circular button head 61 engaging the annular shoulder 47. Each rivet 55 is inserted through the respective hole 53 from the inside of the cup-shaped body 31. One of the rivets 51 extends through a hole in the foot of an L-shaped terminal 63 located on the outside of the closed end of the cup-shaped body, and the outer end of this rivet is upset as appears in FIGURES 2 and 3 to hold the rivet in its hole 49 and to hold the terminal 63 on the body. One of the rivets 55 extends through a hole in the foot of an L-shaped terminal 65 located on the outside of the closed end of the body 31, and the outer end of this rivet is upset as appears in FIGURES 2 and 4 to hold the rivet in its hole 53 and to hold the terminal 65 on the body. The other rivet 51 and the other rivet 55 extend through holes in an electrically conductive plate 67 located on the outside of the closed end of the cup-shaped body 31, and have their outer ends upset as appears in FIGURES 2-4 to hold the rivets in their holes and to hold plate 67 on the body. Plate 67 has an upturned terminal portion 69.

The head 33 at the open end of the cup-shaped body 31 is of conical form with a conical annular shoulder at 71. A cylindrical skirt 73 extending from the head 33 surrounds the annular wall 35 of the cup-shaped body 31. The rim of the skirt 73 is bent over on the external annular shoulder 41 of body 31 as indicated at 75 to hold the body 31 and the head 33 assembled, thereby to constitute the cylinder 27. The head 33 has a screw-threaded extension 77 for connection of the aforesaid oil line 15. In this extension is a port 79 for admission of oil under pressure to the space within the conical head 33.

A flexible diaphragm 81, which may be made of a suitable oil-resistant synthetic rubber and which may have nylon cord reinforcement embedded therein, is clamped, in accordance with the invention, on a 45° angle between the annular shoulder 71 of the head 33 and the conical surface 72 at the end of the annular wall 35 of the cup-shaped body 31. The conical surfaces 71 and 72 direct the diaphragm 81 in a loop as the parts are assembled. This loop is clearly shown at 84 in FIGURE 3 and provides clearance between diaphragm 81 and piston 29, when the diaphragm is in operation. Diaphragm 81 seals off the space within the cup-shaped body 31 from the port 79 and provides a pressure chamber 82 below the diaphragm.

The piston 29 is slidable in the cylindrical chamber 43 within the cup-shaped body 31. It consists of a disk of electrical insulation material, and may be made of the same heat-resistant insulation material as the cup-shaped body 31. It simply has a loose sliding fit in chamber 43. There is no necessity for the piston having a sliding sealing fit in the chamber 43 in view of the provision of the diaphragm 81. The piston is formed with a diametrical groove 83 in its inside face (i.e., its face toward the closed end 39 of the cup-shaped body 31). The piston is also formed with two recesses 85 on opposite sides of the groove 83. These recesses are deeper than the groove and accept the U-shaped ribs 57 of the cup-shaped body 31 and the elongate heads 59 of the rivets 51. An electrically conductive blade 87, of copper, for example, which constitutes the contactor of the switch, is seated in the groove 83. The end portions of this contactor are adapted to engage the heads 61 of the shorter rivets 55. The contactor also has lateral wing portions 89 which project out over the recesses 85 in the piston and over the elongate heads 59 of the longer rivets 51, and which are adapted to engage these elongate heads. As appears in FIGURES 3 and 5, these wing portions of the contactor are located on the sides of the elongate heads 59 toward the closed end 39 of the cup-shaped body 31. A coil compression spring 90 reacts from the end of the recess 45 in the cup-shaped body 31 against the contactor to bias the contactor and the piston to move in the direction away from the closed end of the cup-shaped body. The piston may also be provided with a peripheral notch 91 receiving a rib 92 on the inside of annular wall 35 of body 31 for facilitating positioning of the piston during assembly. This also keeps the piston from rotating.

Rivet heads 59 constitute a first pair of switch contacts engageable by contactor 87 when oil pressure in chamber 82 is below a predetermined value as determined by spring 91. Rivet heads 61 constitute a second pair of switch contacts engageable by contactor 87 when the oil pressure in chamber 82 attains this value. As shown in FIGURE 1, battery 19, ignition switch 21, and starter switch 23 are connected in series in a line 93 connected to terminal 63 and consequently connected to the respective rivet head or contact 59. The plate 67 (denoted in FIGURE 1 as a line) constitutes a terminal common to the other contact 59 and one of the contacts 61. The electric pump 9 is connected in a line 95 extending from this common terminal 67. A line 97 for shutting the starter switch is connected to the other contact 61. Lamp 25 is connected between lines 97 and 95. The starter motor 99 for engine 3 and the starter relay contacts 101 are shown as connected in series in a line 103 in parallel with starter switch 23. The coil 105 of the starter relay is connected in a line 107 in series with the starter switch 23. The inside diameter of shoulder 71 is larger than the inside diameter of the cylindrical chamber 43. This factor, together with the 45° angle clamping support of the diaphragm and the clearance between piston 29 and the diaphragm 81 insures that the diaphragm 81 will be out of the way of piston 29 at zero or very low applied pressures in chamber 82.

Operation is as follows:

When the engine 3 is not running, oil pump 13 is out of operation. Spring 90 then holds contactor 87 down so that it bridges contacts 59 (see FIGS. 1 and 3) with substantial pressure on the contacts for low contact resistance. With the ignition switch 21 closed, when the starter switch 23 is closed to energize the starter motor 99 to crank the engine, a circuit for the electric fuel pump 9 is completed via line 93, contactor 87, terminal plate 67 and line 95. When the engine 3 has started, starter switch 23 is opened. With the engine running, oil pump 13 is driven and pressure developed by the pump is transmitted via line 15 to pressure chamber 82 of the pressure switch 1. This pressure flexes diaphragm 81 upward to move piston 29 and contactor 87 upward so that the contactor bridges contacts 61 with substantial pressure on the contacts for low contact resistance. A circuit for the electric fuel pump is then completed via line 97, closed contacts 61, terminal plate 67 and line 95. Lamp 25 glows when contactor 87 is down to warn of low oil pressure, and is shunted by contactor 87 when the latter is up so that it goes out. The resistance of the filament of the lamp is such that current to electric pump 9 is insufficient for operation of the pump when ignition switch 21 is closed before the starter switch 23 is closed.

As shown in FIGURE 3 and also in accordance with the invention, the inner diameter of the open end of the cup body 31 is smaller than the inner diameter of the top of the pressure chamber 82 of head 33. Thus, the inner peripheral edge of the conical surface 72 of cup 31 forms a rounded rim portion 74 projecting into the head body 33 and beyond the inner peripheral edge of the conical surface 71. The particular construction shown then in which the diaphragm 81 is formed into the loop 84, provides clearance between the diaphragm 81 and the piston 29. Furthermore, as pressure in the head 33 forces the diaphragm upwardly, the projecting inner peripheral edge of surface 72 enables the diaphragm to bend around the rim portion 74 so that the diaphragm is formed into an annular loop or bight construction 76, which takes up the excess diaphragm material as the diaphragm 81 is forced upwardly by fluid pressure in the head. This particular construction results in the diaphragm arranging itself in the position shown in FIGURE 4, in which the central portion of the diaphragm is in solid contact with the bottom of the piston 29 and the portion of the diaphragm between the piston and the clamping surfaces 72 and 71 is wrapped around the rib portion 74 formed by the inwardly projecting surface 72. The formation then of the bight 76 of the loop enables the diaphragm to move up and down in accordance with fluid pressure without undue wrinkling and without undue wear of the diaphragm material, since the bight formed in the diaphragm takes up the excess material as the piston passes over the clamping surfaces of the diaphragm.

The loop 84 thus provides a clearance between the diaphragm and the piston 29 such that the diaphragm will be out of the way of the piston at zero or very low applied pressures in the head portion 33 of the switch. Furthermore, the loop 84 of the diaphragm provides sufficient slack for operating the piston 29 without stretching the diaphragm as pressure within the head 33 presses the piston upwardly. This novel structure and arrangement also provides an accommodation of this diaphragm slack by the action of rim 74 in forming the bight portion 76 as the piston is pressed upwardly. Formation of the bight 76 results in a long life for the diaphragm material as rim 74 forces the slack material of the diaphragm to wrap around rim 74 and provides a rolling action of the diaphragm in the region of the bight. Thus, as the diaphragm and piston move upwardly or downwardly, the action of the diaphragm is a smooth rolling motion through the configuration of the bight rather than any binding or flopping action which is produced without the presence of the bight. Also, this rolling action of the bight eliminates or minimizes the resistance of the diaphragm to the action of fluid pressure and the spring 90. This results in less resistance of the switch to changes in fluid pressure as well as a smoother acting switch operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

A fluid pressure switch assembly comprising a cup-shaped body having an annular rim defining the edge of a cylindric switch chamber, said annular rim being of conical form with its inner marginal edge rounded to provide a smooth inwardly projecting portion, a cup-shaped head defining a pressure chamber having an annular shoulder of conical form facing and parallel to the annular conical rim of said cup-shaped body, the inner diameter of the wall of said cup-shaped head adjacent its rim being greater than the diameter of the inwardly projecting marginal portion of the inner wall of said cup-shaped body, whereby the inwardly projecting marginal portion of the conical annular rim of the cup-shaped body projects inwardly of the inner marginal edge of the second conical surface, a flexible diaphragm means having its peripheral edge clamped between the conical faces of the cup-shaped body and said head and extending across the cup-shaped head to form a flexible wall of the pressure chamber, the projecting marginal edge of the annular rim of the cup-shaped body engaging said diaphragm adjacent its clamped peripheral marginal edge to direct the diaphragm downwardly in a direction away from said cup-shaped body, the diaphragm between the clamped marginal edges including excess diaphragm material for free movement thereof, a plurality of electrical contacts fixed within said cup-shaped body, an electrical contactor bridge within said body for movement into contact with said electrical contacts, spring means for moving said contactor bridge in one direction, means for moving said contactor bridge in the other direction, said last-named means being of piston form and positioned adjacent said diaphragm whereby pressure in the pressure chamber will move said diaphragm upwardly to actuate said contactor bridge, said diaphragm when under operating pressure being deformed to provide an annular bight about the inwardly projecting rounded marginal edge of said cup-shaped body extending toward said pressure chamber, and a fluid inlet formed in said head for supplying pressure to said pressure chamber.

References Cited by the Examiner
UNITED STATES PATENTS

| | | | |
|---|---|---|---|
| 2,037,748 | 4/1936 | Zahodiakan | 200—83 X |
| 2,615,102 | 10/1952 | McMath | 200—83 |
| 2,742,544 | 4/1956 | Lovick | 200—83 |
| 2,794,879 | 6/1957 | Clason | 200—83 |
| 3,121,145 | 2/1964 | Jeep et al. | 200—83 |

BERNARD A. GILHEANY, *Primary Examiner.*

ROBERT K. SCHAEFER, *Examiner.*